United States Patent [19]

Shrinkle

[11] Patent Number: 5,530,600
[45] Date of Patent: Jun. 25, 1996

[54] SIGNAL PROCESSING SYSTEM INCLUDING ADAPTIVE READ EQUALIZER WITH SHUT OFF MODE FOR DISK DRIVES

[75] Inventor: Louis J. Shrinkle, Lucadia, Calif.

[73] Assignee: Conner Peripherals, Inc., San Jose, Calif.

[21] Appl. No.: 430,321

[22] Filed: Apr. 28, 1995

Related U.S. Application Data

[63] Continuation of Ser. No. 201,720, Feb. 25, 1994, abandoned, which is a continuation of Ser. No. 58,050, May 5, 1993, abandoned, which is a continuation of Ser. No. 954,690, Sep. 30, 1992, abandoned, which is a continuation of Ser. No. 559,899, Jul. 30, 1990, abandoned.

[51] Int. Cl.$^6$ .................................................... G11B 5/09
[52] U.S. Cl. ................................................ 360/45; 360/46
[58] Field of Search ................................................ 360/46, 45

[56] References Cited

U.S. PATENT DOCUMENTS

| | | | |
|---|---|---|---|
| 2,901,737 | 4/1959 | Stoval, Jr. | 360/46 |
| 4,244,008 | 1/1981 | Holt | 360/45 |
| 4,535,371 | 8/1985 | Harr et al. | 360/67 |
| 4,564,869 | 1/1986 | Baumeister | 360/46 |
| 4,635,141 | 1/1987 | Coulter | 360/45 |
| 4,809,088 | 2/1989 | Lofgren et al. | 360/45 |
| 5,047,876 | 9/1991 | Grnheimer et al. | 360/45 |

FOREIGN PATENT DOCUMENTS

0433165A1  6/1991  European Pat. Off. ........ G11B 21/10

OTHER PUBLICATIONS

Mee and Daniel, *Magnetic Recording Handbook: Technology and Applications*, pp. 852–878, McGraw-Hill, 1989
*Patent Abstracts of Japan*, vol. 8, No. 45, p. 257, Feb. 28, 1984, Abstract of JP–58–199610(A).

*Primary Examiner*—Vincent P. Canney
*Attorney, Agent, or Firm*—Fliesler, Dubb, Meyer & Lovejoy

[57] ABSTRACT

A microcontroller managed adaptive control system, including a precompensator and a passive equalizer, is provided to decrease the read error rate of a disk drive. An adaptively controllable programmable precompensator adjusts the timing of data bits being written to a disk recording surface with the timing adjustment being relative to the individual bit timing windows. A novel adaptively controllable programmable equalization circuit is provided to enhance the peak amplitudes of data bits read at high frequencies. A microcontroller is programmed to control the programmable precompensator and equalizer to determine the threshold for and subsequently enable the precompensation of the write data and, independently, the equalization of read data with respect to a given media surface.

2 Claims, 4 Drawing Sheets

SIGNAL PROCESSING SYSTEM INCLUDING ADAPTIVE READ EQUALIZER WITH SHUT OFF MODE FOR DISK DRIVES

This application is a continuation of Ser. No. 08/201,720, filed Feb. 25, 1994, now abandoned, which is a continuation of Ser. No. 08/058,050, filed May 5, 1993, now abandoned, which is a continuation of Ser. No. 07/954,690, filed Sep. 30, 1992, now abandoned, which is a continuation of Ser. No. 07/559,899, filed Jul. 30, 1990, now abandoned.

CROSS-REFERENCE TO RELATED APPLICATIONS

The present application is related to the following Applications, all assigned to the Assignee of the present Application:

1. LOW POWER HARD DISK DRIVE SYSTEM ARCHITECTURE, invented by John P. Squires and Louis P. Shrinkle, application Ser. No. 152,069, filed Feb. 4, 1988;

2. TWO AND ONE HALF INCH DIAMETER MULTIPLE DISK DRIVE, invented by Frederick Mark Stefansky, application Ser. No. 07/531,788, filed Jun. 1, 1990;

3. DISK DRIVE SYSTEM EMPLOYING ADAPTIVE READ/WRITE CHANNEL CONTROLS AND METHOD OF USING SAME, invented by John P. Squires, application Ser. No. 07/420,371, filed Oct. 12, 1989; and 4. DISK DRIVE SYSTEM USING MULTIPLE EMBEDDED QUADRATURE SERVO FIELDS, invented by Louis J. Shrinkle and John P. Squires, application Ser. No. 07/386,504, filed Jul. 27, 1989.

FIELD OF THE INVENTION

The present invention is generally related to the signal processing of data transferred to and from the disks of a hard disk drive and, in particular, to a precompensation and equalizer system for improving the accuracy of data ultimately read from the surface of a disk.

BACKGROUND OF THE INVENTION

The predominant interests in the design of small, high-capacity hard disk drives include continuing to increase the total drive storage capacity while further reducing the overall size of the hard disk drive. As a consequence, the diameter of the hard disk media utilized to store data has decreased while the data bit density within the data tracks has increased.

Given that data is stored in a data band consisting of concentric data tracks subdivided into sectors of equal radial arc and equal data capacity, data sectors located on the inner diameter tracks must be recorded with a greater bit density relative to the outer diameter tracks. The read data channel must necessarily handle the full range of data frequencies read from the disk media. However, read channel errors will occur in response to timing variations and signal strength losses in the read data. These errors are most prevalent when reading data from the inner tracks.

Timing variations are due, in part, to a phenomenon known as bit crowding. Ideally, data bits are read as a signal peak generally centered within respective, fixed timing windows. However, the timing windows are continuously adjusted based on the period of the read data peaks. Bit crowding effectively shifts the data peaks, under certain circumstances, as read from the disk media. Not only are the affected peaks not centered within their respective bit windows, but the timing for subsequent timing windows is affected. As would be expected, any failure in detecting a read data peak appropriately within its correct timing window results in a read data error.

The bit crowding phenomenon is a consequence of the non-discrete reading of the data bits by a read head having a finite length perpendicular to the track width. Consequently, the read data signal strength is dependant not only on the characteristics of the data bit closest to the read head, but also on the adjacent bit characteristics. Specifically, sequential data bits of complementary polarity will destructively interfere. Thus, the peak signal magnitude read for each of a sequence of complementary data bits will be reduced. Where a peak is asymmetrically reduced, ie., the first or last bit in a sequence of complementary bits, the effective location of that bit peak is effectively shifted away from the nearest complementary bit. Thus, the noise margin is reduced due to the reduced peak signal strength of the read data and, further, timing variations are introduced. The peaks of middle bits are narrowed and reduced in magnitude resulting in a greater difficulty in detecting the narrowed peak and, again, a reduced noise margin. Although the resultant read data failures are in general "soft" errors, i.e., recoverable and intermittent, any increase in even the soft error rate leads to a proportional decrease in the performance of the disk drive as a whole.

Conventionally, the reduction in noise margin due to bit crowding has not been considered to be significant. Rather, a technique known as precompensation has been developed to reduce the significant timing variation aspect of bit crowding. Precompensation adjusts the write timing of data bits that would be asymmetrically shifted by bit crowding so that the data bit signal peak is read properly centered within its bit window. Conventional precompensation utilizes a fixed write timing offset for affected data bits for all data tracks less than a fixed, predetermined track diameter.

Another consequence of bit crowding is the roll-off in the amplitude of the read data as bit density increases. For any given data pattern, the density of data bits, as represented by flux changes, increases as the circumference of the data track decreases. Dependent on the frequency response of the read head, the active gap length and flying height of the head, the thickness of the media and other related factors, a data density threshold will exist above which the amplitude of all data bits will begin to reduce with increasing data bit density.

The conventional solutions to this problem include increasing the frequency response of the head, reducing the flying height of the head and decreasing the gap length of the head. Other solutions include using a high frequency peaking amplifier to enhance, or equalize, the sensitivity of the read channel while reading high data bit density data streams. Conventionally, an equalization amplifier having an increased gain factor above a fixed frequency threshold is provided in the read data channel. However, this latter solution is not desired for at least two reasons. First, the requisite peaking amplifier and delay line would add a significant design complexity and cost factor to the overall design and construction of the disk drive. Second, conventional delay lines suitable for use in such applications typically require a significant additional amount of driving power; a result that is not desired in the current and anticipated future generations of small, high performance hard disk drives.

SUMMARY OF THE INVENTION

A purpose of the present invention is therefore to provide a system for improving the accuracy of the read data channel in recovering data stored at high bit densities.

This is accomplished in the present invention by providing a precompensator for a adjusting the timing of data bits being written to a disk recording surface with the timing adjustment being relative to the individual bit timing windows. A programmable equalization circuit is provided in the read data channel to enhance the apparent peak amplitudes of data bits read at high frequencies. Also provided is a microcontroller programmed to control the programmable precompensator and equalizer to determine to enable the precompensation of the write data and, independently, the equalization of read data for a set of data tracks.

Thus, an advantage of the present invention is that it provides a system of optimally improving the read data accuracy in a hard disk drive.

Another advantage of the present invention is that the selective use of precompensation and equalization substantially improves the read data error rates for disk drives having disks of a diameter equal to or less than approximately 96 millimeters and particularly for disks having diameters equal to or less than approximately 65 millimeters.

A further advantage of the present invention is that the microcontroller may be preprogrammed to identify a track within the band of data tracks on the surface of the disk where precompensation or equalization, or both, would improve the read accuracy of the disk drive.

Still another advantage of the present invention is that precompensation and equalization may be independently enabled to allow the microcontroller to find the optimal combination of the equalization in precompensation for all data tracks on each surface of the disk drive.

A still further advantage of the present invention is that it provides for the programmable selection of varying degrees of precompensation and equalization as may be necessary to obtain the optimal level of read/write performance for any particular track on any particular surface of a disk drive.

A yet still further of the advantage of the present invention is that it obtains the foregoing advantages with a minimum of additional circuitry, without any significant increase in the power requirements of the disk drive and through the use of a passive equalization circuit.

BRIEF DESCRIPTION OF THE DRAWINGS

These and other advantages and features of the present invention will become apparent and readily appreciated as the same becomes better understood by reference to the following detailed description when considered in connection with the accompanying drawings, in which like reference numerals designate like parts throughout the figures thereof, and wherein.

DETAILED DESCRIPTION OF THE INVENTION

Figure 1:
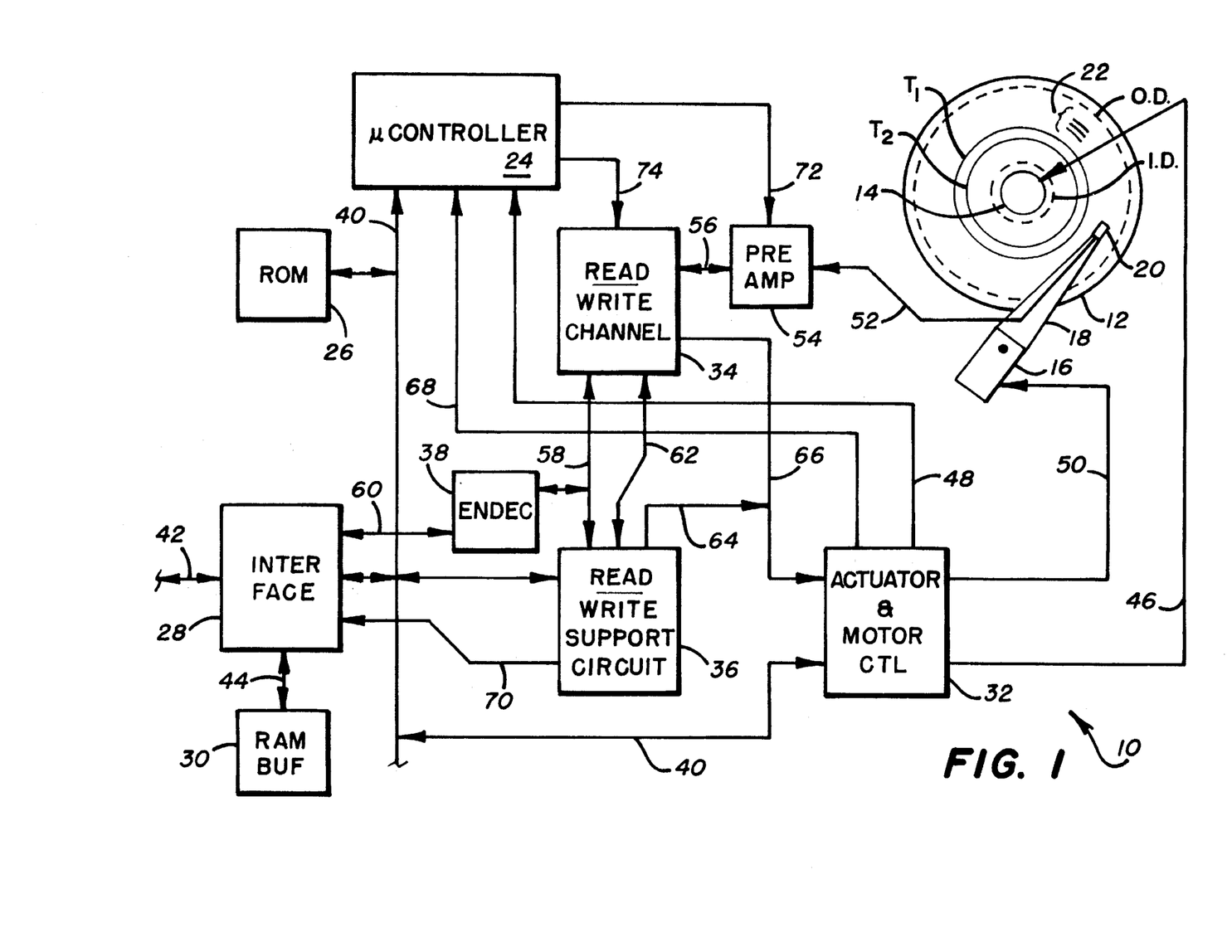
FIG. 1 is a block diagram of the electronic controller for a hard disk drive in accordance with the preferred embodiment of the present invention.

A disk drive system consistent with the principles of the present invention, generally indicated by the reference 10, is shown in FIG. 1. The preferred embodiments of the present invention utilize an embedded microcontroller control system to manage and direct all essential functions of the electrical and mechanical aspects of the disk drive system 10. The drive system 10 includes one or more disks 12 spun in parallel planes by a spindle motor 14. Data is stored in a data track band on each surface of a disk 12 defined by an outer (OD) and inner (ID) closed track diameter. An actuator assembly 16, including a load beam 18 and read/write head 20 per data surface, is utilized to transfer data with respect to concentric data tracks 22 within the track band.

A microcontroller 24, utilizing a minimum number of dedicated control support circuits, directly implements all of the primary functions of the drive system 10. In the preferred embodiments of the present invention, the microcontroller 24 is a 3 MHz clock rate Motorola MC68HC11 HCMOS single chip microcontroller, as described in the MC68HC11A8 CMOS Single Chip Microcomputer Technical Data Book (ADI1207) available from Motorola, Inc., Motorola Literature Distribution, P.O. Box 20912, Phoenix, Ariz. 85036. A read only memory (ROM) 26 is coupled to the microcontroller 24 by way of a general purpose data address and control bus 40. The ROM 26 is utilized to store a microcontroller control program for supporting the four principal tasks necessary to implement the full operating functionality of the disk drive system 10. These tasks include interface, actuator, spin motor and read/write control. An additional task, monitor, is provided to implement initial drive self-testing and qualification of drive operational parameters. Specifically, the monitor task includes algorithms for selecting the application of precompensation and equalization on various tracks in the track band in combination with varying other parameters, such as the duration of bit windows, to evaluate the read/write error rate. In this manner, threshold tracks $T_1$ and $T_2$, and potentially another track $T_3$ can be identified as the threshold tracks where the read/write error rate is improved by the application of either precompensation, equalization, or both. The algorithm for evaluating a potential threshold track T involves repeatedly writing and reading data to the data track with different combinations of precompensation, equalization to determine, for a given reduced duration bit window, the number of read bit errors encountered. The track T may be considered a threshold track when there is an empirical or statistically significant improvement in the tested bit error rate for a particular combination of precompensation or equalization, or both. In the preferred embodiment of the present invention, a single threshold track is determined for all data surfaces as the threshold cylinder for using both precompensation and equalization.

An interface control circuit 28 is provided to support the microcontroller 24 in execution of the interface task. The interface controller 28, in a preferred asynchronous SCSI embodiment of the present invention, is implemented as a Cirrus Logic CL-SH250 integrated SCSI disk controller, manufactured and distributed by Cirrus Logic, Inc., and described in the CL-SH250 technical data sheet, available from Cirrus Logic, Inc., 1463 Centre Pointe Drive, Milpitas, Calif. 95035. A comparable synchronous SCSI interface controller, the AIC-6110, is available from Adaptec, Inc., 691 South Milpitas Blvd., Milpitas, Calif. 95035. A functionally equivalent interface controller, suitable for interfacing to the IBM personal computer model "AT" peripheral bus (the so called "IDE" interface) is also available from Cirrus Logic, Inc.

The interface controller 28, in general, provides a hardware interface between the disk drive system 10 and a host computer system, typically a data processing system, via a communications bus 42. The interface controller 28 utilizes a random access memory (RAM) buffer 30, accessible through a local data and control bus 44, to buffer data and commands received from or awaiting delivery to the host computer system. In this manner, the interface controller 28 is the primary manager of the bidirectional data stream between the communications bus 42 and the system 10.

Motor and actuator controller 32 is provided as an internal interface between the microcontroller 24, the spin motor 14 and the actuator assembly 16. The controller 32 directly supports the commutation of the spin motor 14 by selectively providing commutation current to the motor 14 via the lines 46. Commutation state selection is effected by provision of a digital word from the microcontroller 24 to a commutation control latch contained within the controller 32. This control word is used to select the field winding phase pair of the spin motor 14 that is to receive commutation current when commutation is enabled. The commutation current is switched by the controller 32 onto corresponding pairs of commutation lines of the lines 46. A second control word issued by the microcontroller 24 and latched by the controller 32 via the bus 40 is used to enable the provision of commutation current.

A voltage proportional to the current conducted through the selected field winding phase pair of the spin motor 14 is provided as a current feed-back voltage level, on line 48, to an analog-to-digital converter input of the microcontroller 24.

In control of the actuator assembly 16, the actuator and motor controller 32 provides for the latched digital-to-analog conversion of a digital actuator position control word. This control word is determined and provided by the microcontroller 24 via the bus 40 to the controller 32. The controller 32 further provides for a voltage-to-current buffering of the analog voltage produced by the latched digital-to-analog convertor. The resultant output current is then provided on line 50 to a voice coil motor present within and functioning as the active driver of the actuator assembly 16. The digital position control word, as thus provided via the bus 40 from the microcontroller 24, represents an adjustment to the position of the read/write head 20 of the actuator 16 relative to the data tracks 22.

A read/write channel controller 34 in combination with the interface controller 28, a read/write support circuit 36, and an encoder/decoder (ENDEC) 38, similarly acts as an internal control interface between the microcontroller 24 and the read/write heads 20 of the actuator assembly 16. The channel controller 34 buffers raw data transferred between the heads 20, via the raw data lines 52, preamplifier circuit 54, line 56, and the interface controller 28, via line 58, the ENDEC 38 and line 60. Raw data is also provided to the read/write support circuit 38 via line 58.

The operation of the read/write channel controller 34 is controlled by the read/write support circuit 36 via control line 62. The control signals on control lines 62 include quad servo burst gating signals for routing the received raw data temporally corresponding to each of four servo bursts onto raw peak detector signal lines 64. These raw servo burst signals are provided through the motor and actuator controller 32, for peak sample-and-hold buffering and then onto lines 68 to respective analog-to-digital convertor inputs of the microcontroller 24. The control lines 64 allow the read/write support circuit 36, in response to a control word provided from the microcontroller 24 via bus 40, to reset the sample and hold circuits located within the actuator and motor controller circuit 32. The design of a disk drive embodying the quad servo burst system employed by the present invention is described in the above-referenced U.S. patent application titled DISK DRIVE SYSTEM USING MULTIPLE EMBEDDED QUADRATURE SERVO FIELDS, which is expressly incorporated by reference herein.

The interface controller 28, in combination with the ENDEC 38, provides for the buffered serialization and deserialization, as well as data clock encoding/decoding, of data. However, the read/write support circuit 36, operating from the raw data received via line 58, is used to detect sector marks and to acquire raw gray code data from each servo sector field embedded in the data tracks. A sector mark detect signal is provided via line 70 to the interface controller 28 to initiate any pending sector data processing.

Configuration and initiation of disk read/write functions by the interface controller 28 and read/write support circuit 36 are performed under the direct control of the microcontroller 24. That is, both of these controllers 28, 36 are directly programmable by the microcontroller 24.

The mechanical configuration of a disk drive embodying a preferred embodiment of the present invention is described in, for example, the above-referenced U.S. patent application titled TWO AND ONE HALF INCH DIAMETER MULTIPLE DISK DRIVE and is expressly incorporated herein by reference. The aspects of the mechanical structure pertinent to the present invention are set forth in Tables 1 and 2 below.

TABLE 1

| | |
|---|---|
| Number Data Cylinders | 831 cylinders |
| Sectors per Track | 39 sectors |
| Number of Disks | 2 |
| Number of Data Surfaces | 4 |
| Bytes per Sector | 662 bytes |
| Data Bytes per Sector | 512 bytes |
| Data Capacity per Data Surface | 16.6 Mbytes |
| Total Data Capacity | 66.4 Mbytes |

TABLE 2

| | |
|---|---|
| Disk Diameter | 65 millimeters |
| Data Track Band Width | 10.4 millimeters |
| Track Density | 2100 tracks/inch |
| Bit Density (max) | 28,000 fci |
| Head Width | 9 micrometers |
| Track Width | 12 micrometers |

The microcontroller 24 directly controls an analog signal multiplexer circuit provided internal to the preamplifier 54. This analog multiplexer provides a bidirectional multiplexed path between the multiple head data lines 52, each corresponding to a respective read/write head 20, and the combined read/write data lines 56. The combined read/write data lines 56 include a write data line for carrying data from the read/write channel controller 34 to the preamplifier 54 for multiplexing onto a corresponding one of the head data lines 52. Data returned by the preamplifier 54 to the read/write channel controller 34 is via a pair of differential signal lines utilized to carry a differential signal generated by the preamplifier 54 from an internal multiplexer selected one of the head data lines 52. The analog multiplexer internal to the preamplifier 54 is directly controlled by the digital lines 72.

The microcontroller 24 also controls the internal functions of the read/write channel controller 34 by a number of control lines 74. Specifically, in accordance with the preferred embodiments of the present invention, the microcontroller 24 utilizes the control lines 74 to digitally select the application of precompensation to the write data transferred via the lines 56 and equalization to the differential read signals returned via the lines 56.

Figure 2:
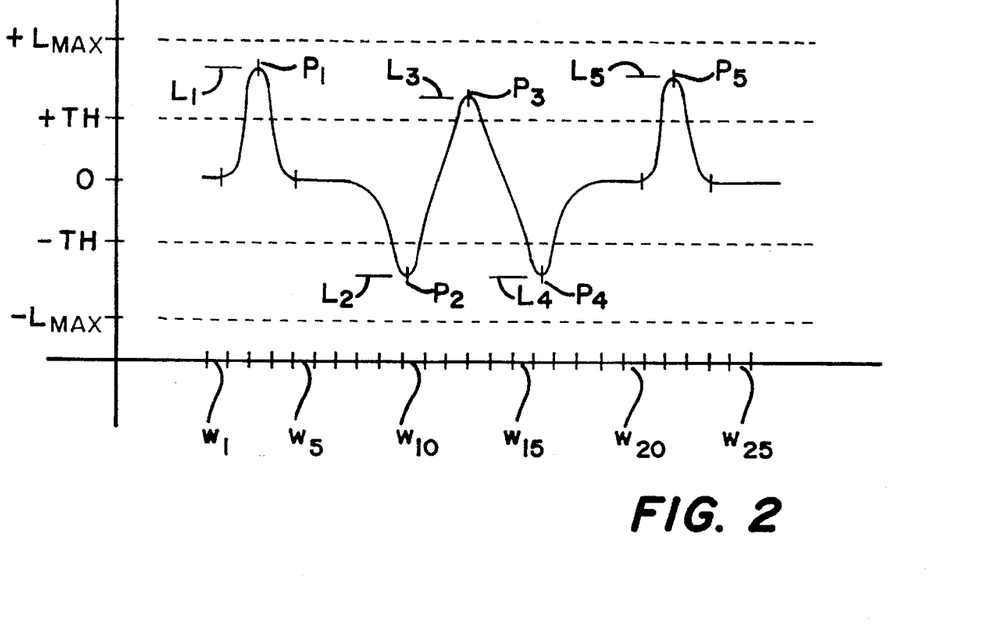
FIG. 2 is a graphical illustration of the effects of bit crowding with respect to the temporal occurrence and peak amplitude of the data bits within the data bit windows.

Referring now to FIG. 2, a hypothetical waveform corresponding to the read data signal is shown. Specifically, this signal represents the delta voltage potential signal provided on the differential read data lines from the preamplifier circuit 54. The waveform is shown centered about a DC decoupled zero voltage level. Minimum read data thresholds +TH and −TH and the maximum peak data limits +$L_{MAX}$ and −$L_{MAX}$ are shown. In a preferred embodiment of the present invention, the read data thresholds +TH and −TH are set at approximately ±40% of the maximum peak data levels. Horizontally, the waveform is shown mapped against the ideal temporal occurrence of data windows $W_1$ through $W_{25}$. The waveform peaks occurring at $P_1$, $P_2$, $P_3$, $P_4$, and $P_5$ represent flux changes in the data read from the surface of the disk during the corresponding data bit windows. This hypothetical waveform therefore decodes as the binary string X0010000000100100100001000X.

The hypothetical waveform shown in FIG. 2 illustrates the problems addressed by the present invention. The peak $P_1$ shows a reduced peak level $L_1$ from the ideal maximum level +$L_{MAX}$. This is a consequence of the fact that for any given pattern of flux changes recorded on the surface of disk, the data bit windows are progressively smaller in relationship to the head gap length on inner diameter tracks relative to outer diameter tracks. Consequently, for a fixed gap length and flying height, the strength of the signal read as a consequence of a flux change will be reduced increasingly toward the inner diameter track.

The peaks $P_2$, $P_3$, $P_4$ illustrate this problem further in conjunction with the peak shifting consequences of bit conjunction. The overlapping read of the three consecutive flux changes results in the reading of a single signal that is not discrete with respect to any of the flux changes. Rather, the read signal corresponding to the peak $P_2$ is affected by the occurrence of the flux change giving rise to the peak $P_3$. Consequently, the peak at $P_2$ is shifted to effectively occur earlier within the window $W_{10}$ or, due to timing variations, within the window $W_9$. Conversely, the peak $P_4$ is shifted to effectively occur later within the data bit window $W_{16}$ if not, again to the window $W_{17}$. Because of the symmetrical effect of the flux changes occurring near the windows $W_{10}$ and $W_{16}$, the peak $P_3$ is not significantly time shifted. However, the peak level $L_3$ of the peak $P_3$ is further significantly reduced by the combined effect of the adjacent complimentary flux change occurrences. To a lesser degree, principally due to the absence of flux changes near the data bit windows $W_7$ and $W_{19}$, the peak levels $L_2$ and $L_4$ are not as reduced as that of the peak $P_3$. The reduction in the peak levels $L_1$, $L_2$, $L_3$, $L_4$, $L_5$ regardless of the cause of the reduced peak levels, statistically increases the likelihood of a read error. As an idealized waveform, the contribution to the shape of the waveform due to the occurrence of random electronic noise is not shown. When considered, the occurrence of noise in combination with the hypothetical waveform in FIG. 2 may result in the peak at $P_3$ failing to be detected as occurring at greater than the positive read threshold +TH. Consequently a read error will occur. Such an error is typically identified through an evaluation of the corresponding error correction code for the sector within which the hypothetical waveform of FIG. 2 occurs. Time will therefore be consumed in correcting the error, particularly where correction of the error requires a re-read of the entire data sector.

Figure 3:
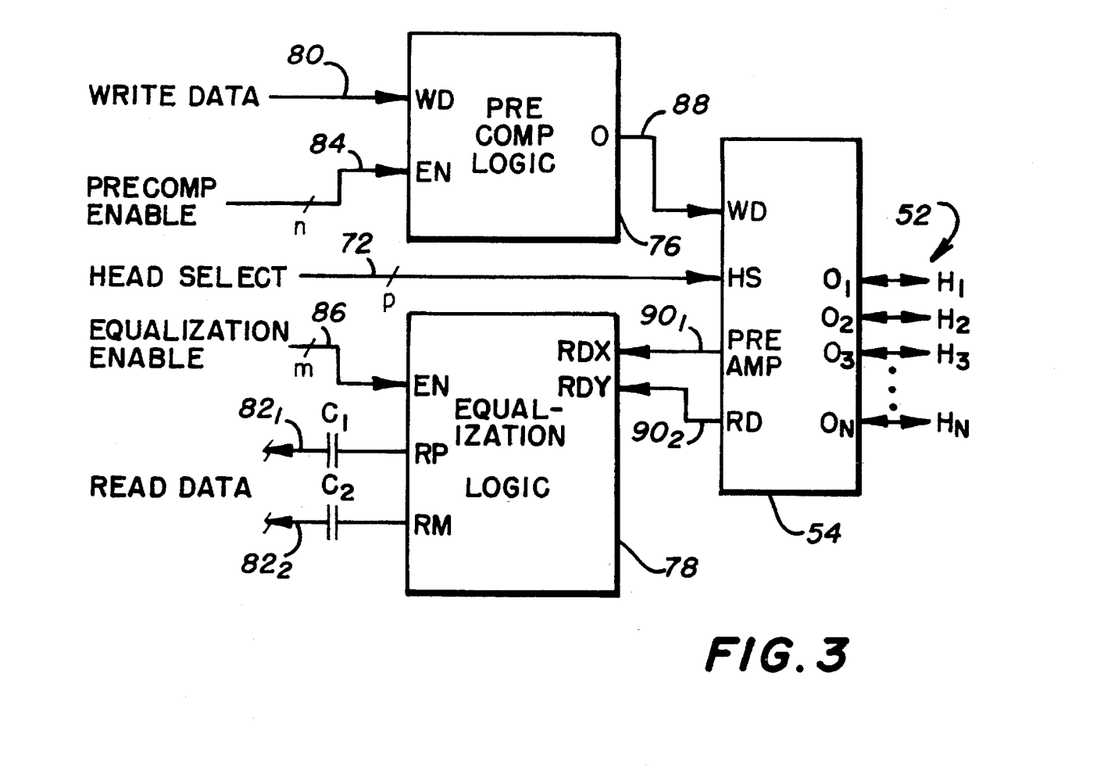
FIGS. 3 is a block diagram of the programmable precompensation and programmable equalization signal enhancement system constructed in accordance with the preferred embodiment of the present invention.

In accordance with the present invention, a write precompensation logic unit 76 and equalization logic unit 78 are provided within the read/write channel controller 34 to correct for effective timing shifts of the peaks in the read data waveform and peak level losses. The precompensation logic unit 76 receives digital write data on an input line 80. This digital data, once processed, is provided onto an output line 88 to the write data input of the preamplifier 54. The digital write data is processed by the precomp logic unit 76 in response to precompensation control signals provided on control lines 84. The precompensation logic imposes a digitally selectable delay to the write data received on line 80.

In a preferred embodiment of the present invention, the precompensation enable signal is used to either enable or disable the precompensation logic unit 76. When enabled, the precompensation logic unit 76 nominally provides a fixed unit delay to the write data before being passed onto the line 88; when disabled, no delay is imposed. In the enabled mode, the application of the delay is dependant on the specific pattern of data provided on the write data line 80. Within a predetermined number of consecutive bits, the boundary bits in an asymmetric pattern are time shifted relative to the adjacent bits to preemptively compensate for peak shifts in the subsequently read data. That is, in a binary data sequence of X0001001001000X, the first and last occurrences of the logical one bits are within a minimum bit sequence length to require precompensation. The first logic one bit is compensated by increasing the delay of that data bit through the procompensation logic unit 76 relative to its adjacent bits. Similarly, the last logic one bit is compensated by a reduction in its delay time through the precompensation logic unit. Thus, these two bits will be written relatively closer in time to one another than would otherwise nominally occur.

Further in accordance with the preferred embodiment of the present invention, the precompensation enable signals on lines 84 may encode a value of the precompensation time shift, either positive or negative relative to the nominal delay, that is to be applied by the precompensation logic unit 76 when enabled. This can be readily achieved through the utilization of a tapped delay line where the precompensation enable signals control a multiplexer for selecting a tap output and where the logic of the precompensation logic unit 76 adjusts the delay provided by each of the tap outputs dependant on the pattern of the write data provided via line 80 to an input of the tapped delay line.

The digital write data received by the preamplifier 54 is converted to an analog signal and provided as an input to an internal analog multiplexer. The operation of the multiplexer is controlled by head select control signals provided to the preamplifier 54 via the control lines 74. The outputs of the multiplexer are coupled to the respective head data lines 52 to the respective read/write heads 20 ($H_1$-$H_n$). Preferably, the number of head select control lines 74 is sufficient to encode the digital selection of a specific one of the read/write heads 20 ($H_1$-$H_n$).

Data read by the read/write heads 20 is returned by the head data lines 52 for amplification by the preamplifier unit 54 after selection through the internal analog signal multiplexer. The resultant signal is provided as a differential signal on the differential read data lines $90_1$, $90_2$ to the equalization logic unit 78.

The equalization logic unit 78 functions to equalize the peak amplitude of high frequency read data signals to a level generally comparable to the peak amplitudes of the lower frequency data signals. The equalized differential read data signal is provided onto the read data differential signal lines $82_1$ and $82_2$, after passing through DC blocking capacitors $C_1$ and $C_2$, respectively. Thus, the equalization logic unit 78 is preferably provided between the preamplification unit 54 and the peak detection logic circuitry within the read/write channel 34 that the read data lines $90_1$, $90_2$ would conventionally have been coupled to.

The operation of the equalization logic unit 78 is controlled by control signals provided via the equalization enable control signal lines 86. At a minimum, a single signal is provided to enable or disable the operation of the equalization logic unit 78. Alternatively, where the equalization logic unit 78 includes more than a single stage of equalization circuitry, for example, multiple signals may be provided via the equalization enable control lines 86 to selectively control the amount of equalization provided by the equalization logic unit 78.

In accordance with the preferred embodiment of the present invention, the precompensation enable control lines 84 and equalization enable control lines 86 are coupled to the microcontroller 24 as a portion of the read/write channel 34 control lines 74. Consequently, the microcontroller 24 is capable of directly controlling both the application and level of precompensation and equalization applied to the read/write data stream.

Figure 4:
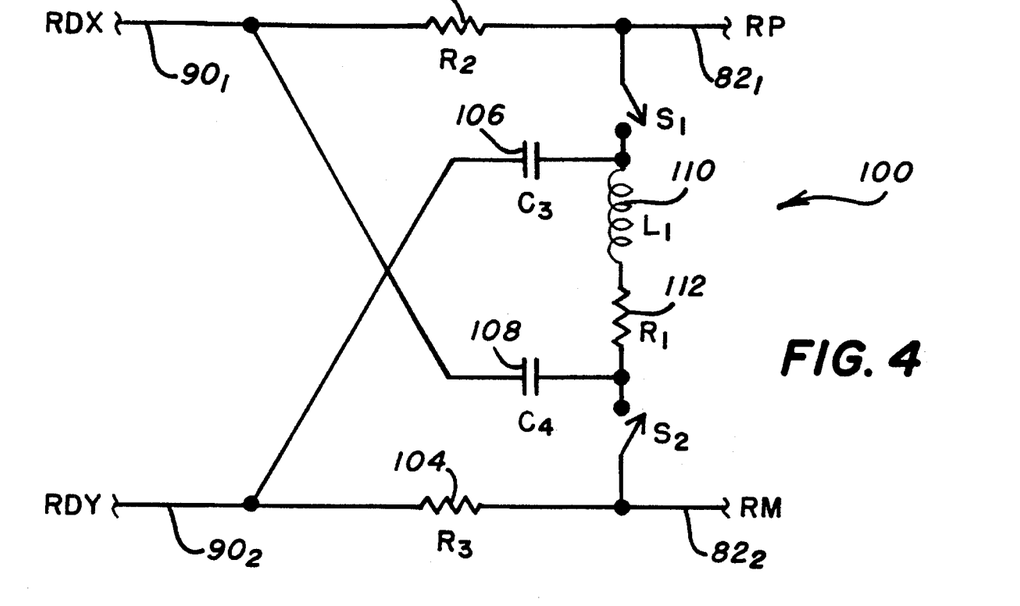
FIG. 4 is a circuit schematic of a preferred embodiment of the equalization control circuit of the present invention.

Referring now to FIG. 4, a simplified schematic diagram of a single stage equalization circuit constructed in accordance with the preferred embodiment of the present invention is shown as a circuit 100. The equalization circuit 100 provides low impedance resistors 102, 104 ($R_2$, $R_3$) in series between the read data lines $90_1$, $82_1$ and $90_2$, $80_2$, respectively. Capacitors $C_3$ 106 and $C_4$ 108 are connected between the read data lines $90_2$, $90_1$ and the terminal ends of a series connected inductor $L_1$ 110 and resistor $R_1$ 112, respectively. A switch $S_1$ is provided to couple the read data line $82_1$ to the terminal node closest to the inductor $L_1$ 110. Similarly, a switch $S_2$ is provided to selectively couple the terminal series node closest to the resistor $R_1$ to the read data line $82_2$. In the preferred embodiment of the present invention, the open or close state of the switches $S_1$, $S_2$ is commonly controlled by the microcontroller 24. With the switches $S_1$, $S_2$ closed, the equalization circuit 100 is operative. Consequently, the differential signal provided on the read data lines $90_1$, $90_2$ is shaped by the equalizer circuit 100 to preferentially increase the amplitude of high-frequency signal peaks.

When the switches $S_1$, $S_2$ are open, the operation of the circuit 100 as an equalizer is defeated. Instead, the capacitors 106, 108, inductor 110 and resistor 112 remain series coupled between only the read data lines $90_1$, $90_2$. However, the load represented by these circuit components has a high series impedance between the read data lines $90_1$, $90_2$. Consequently, the effective impedance of the equalizer circuit 100 when switches $S_1$ and $S_2$ ante open is the net resistance of the resistors 102, 104.

Figure 5:
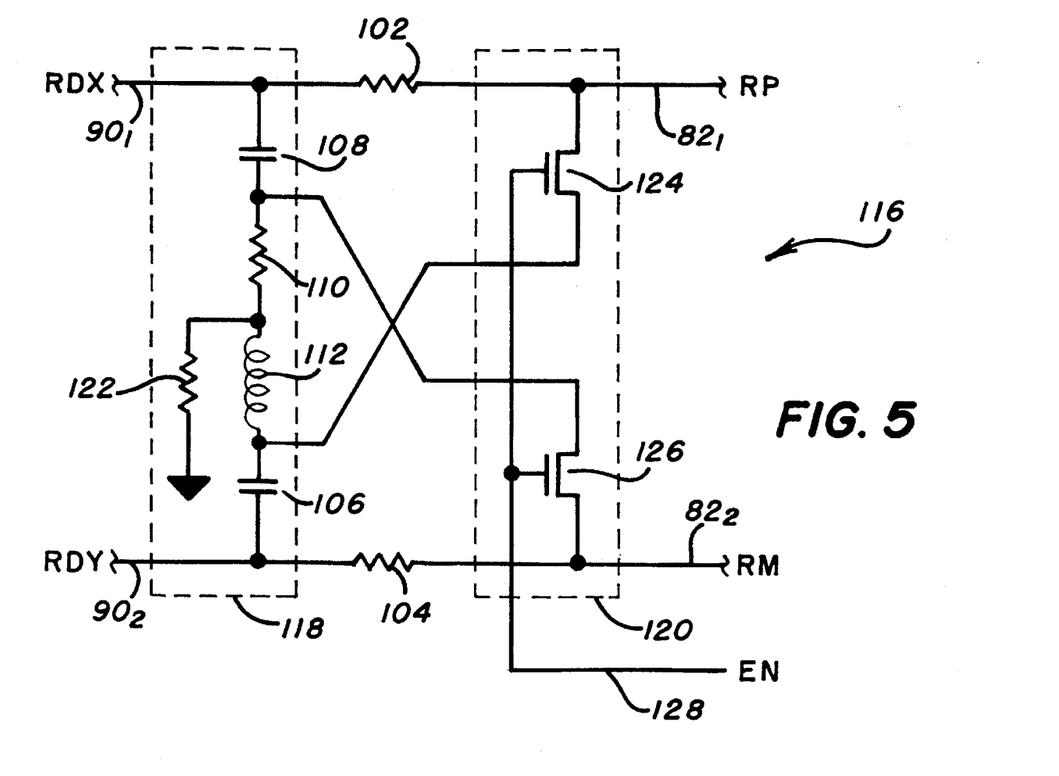
FIG. 5 is a preferred embodiment of the equalization control circuit of the present invention.

Referring now to FIG. 5, a preferred embodiment 116 of the equalizer circuit 100 is shown. The equalizer circuit 116 is logically divided into an equalization section 118 and a switching section 120. The equalization section 118 includes the capacitors $C_1$ 106, $C_2$ 108, resistor $R_1$ 110 and inductor $L_1$ 112. An additional biasing resistor 122 is provided between a ground reference point and the series connection node between the resistor 110 and inductor 112. The switching section 120 includes analog signal switching FETS 124, 126 coupled between the read data lines $82_1$, $82_2$ and the equalization section 118. The resistors, 102, 104 are provided, as before, between the equalization and switching sections 118, 120. The equalization enable control line 128 is connected in common to the gates of the FETS 124, 126. The preferred values for the components of the equalization circuit 116 are give in Table 3.

TABLE 3

| Component | Value | Range |
|---|---|---|
| $R_1$, | 330Ω | 100–400Ω |
| $R_2$ | 180Ω | 100–200Ω |
| $R_3$ | 180Ω | 100–200Ω |
| $R_4$ | 470KΩ | 100–750KΩ |
| $L_1$ | 10 μH | 1–20 μH |
| $C_3$ | 150 pf | 100–200 pf |
| $C_4$ | 150 pf | 100–200 pf |
| $S_1$, $S_2$ | Siliconix | 1–2 pf node cap. |
|  | SD5402 | 20–30Ω series res. |

Figures 6, 7:
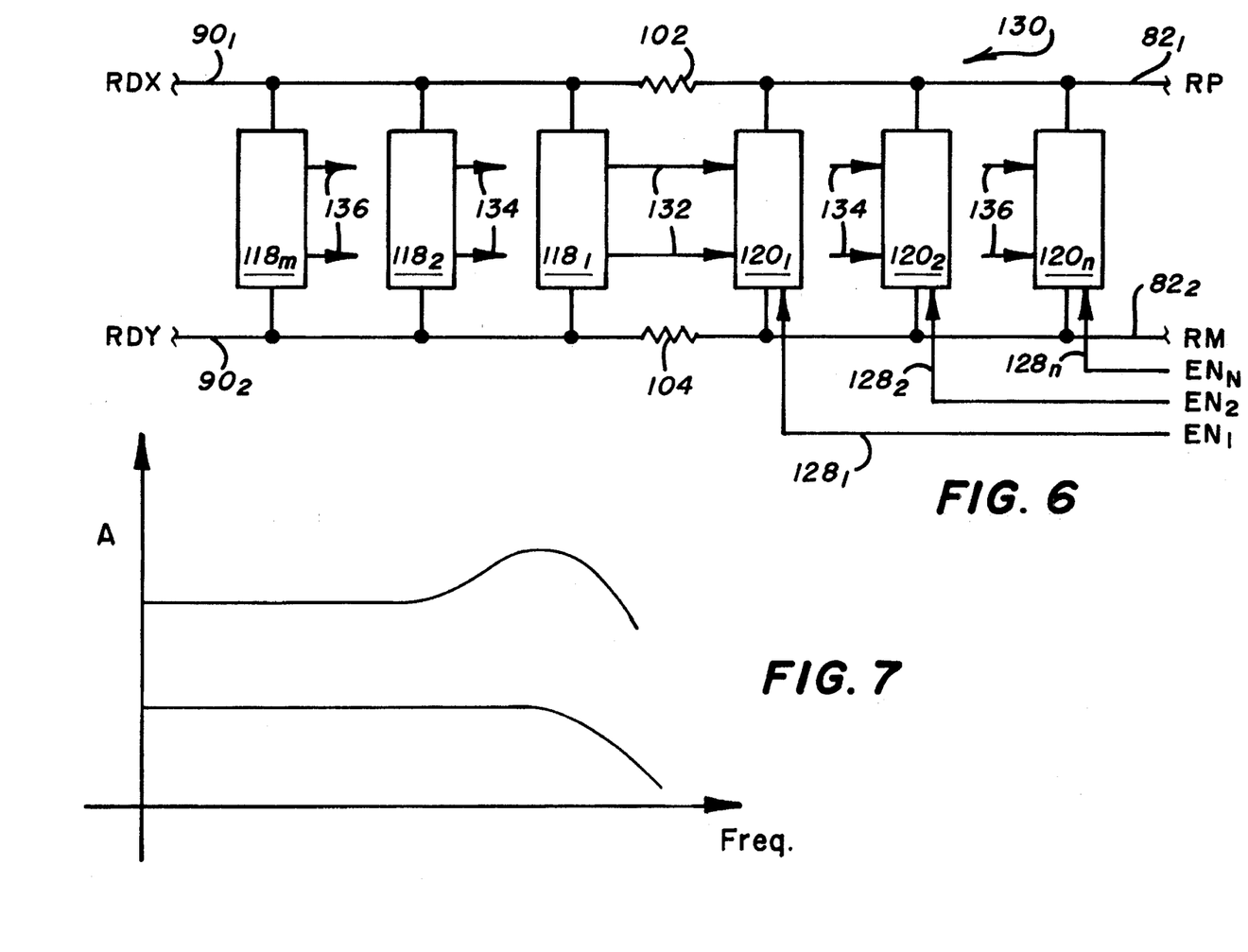
FIG. 6 is a simplified block diagram of a multistage programmable equalization circuit constructed in accordance with the preferred embodiment of the present invention.
FIG. 7 is a graph of the frequency response.

An alternate embodiment 130 of the equalization logic unit 178 is shown in FIG. 6. There, a series of equalization sections $18_{1-N}$ are provided coupled between the read data lines $90_1$, $90_2$. A like number of switching sections $120_{1-N}$ are coupled between the read data lines $82_1$, $82_2$. Each equalization stage $118_{1-N}$ is coupled to its corresponding switching stage $120_{1-N}$. Equalization enable signals are provided to the respective switching sections $120_{1-N}$ via the enable control lines $128_{1-N}$. In this manner a progressive series of equalization values can be selectively applied to the differential signal provided on the read data lines $90_1$, $90_2$. Therefore, a precise amount of equalization may be selectively applied to the differential read data signal as appropriate for any particular track that is being accessed by the read/write head 20.

The present invention allows the independent and programmable application of precompensation and equalization to the read/write data stream. In accordance with the principles of the present invention, the microcontroller 24 is capable of determining the threshold track within the track band of each data surface where the respective application of precompensation and equalization will improve the read data error rate of the drive. Specifically, the microcontroller 24 may test the effect of precompensation, equalization, or both on data first written, then read from a potential threshold data track. Varying the data bit window timing and read data thresholds in repeated read/write tests will allow the microcontroller to identify the particular combination of precompensation and equalization for the specific data track in terms of minimum error rate. The design of a disk drive embodying the quad servo burst system employed by the present invention is described in the above-referenced U.S. patent application titled DISK DRIVE SYSTEM EMPLOYING ADAPTIVE READ/WRITE CHANNEL CONTROLS AND METHOD OF USING SAME, which is hereby incorporated by reference.

Thus, in a preferred embodiment of the present invention, a single cylinder may be identified as the threshold for enabling both precompensation and equalization. This achieves a reasonable improvement in the read error rate with a minimum of testing by the microcontroller 24. Alternately, the testing may be repeated for individual data surfaces, for independent enablement of equalization and precompensation and for different levels of equalization and precompensation. Although such a degree of testing will require some significant amount of time, the data read error rate will be optimum for each data track of each surface.

From experimental testing, it has been determined that the combined use of precompensation and equalization, particularly where equalization is provided by the programmably controlled, passive equalization circuit of the present invention, does not degrade the effectiveness of either precompensation or equalization. Rather, as set forth in the following example, a distinct improvement in read error rates is obtained where both are used.

EXAMPLE

The data generated in this example was developed on an embodiment of the present invention, as shown and described in FIGS. 1, 3, and 5 and Tables 1, 2 and 3, utilizing two state precompensation (enable, disable) and two state equalization (enable, disable). The reported margin factor is inversely related to the bit window duration for a predetermined bit error rate, such as $1 \times 10^{-6}$ errors per bits read. Thus, the margin factor is a measure of the quality of the read/write data channel where a higher number indicates better quality in terms of read data error rates.

| Track | Margin Factor | Adoption |
|-------|---------------|----------|
| 33F | 2513 | None |
| 33F | 3384 | Precompensation |
| 33F | 2849 | Equalization |
| 33F | 3401 | Both |

This data, obtained at the I.D. track, demonstrates a substantial improvement by application of both precompensation and equalization. Testing of larger diameter tracks with therefore result in the identification of a threshold track where the use of both precompensation and equalization does not yield a significant increase in the margin factor when precompensation or equalization is disabled.

Thus, a system for improving the quality of the read/write data stream has been described.

Naturally, many modifications and variations of the present invention are possible in light of the above detailed description of the present invention. It is therefore to be understood that, within the scope of the appended claims, the present invention may be practiced otherwise than is specifically described.

I claim:

1. In a disk drive having a data surface providing for the storage of data, a head for writing data to the data surface and sensing data stored on the data surface, a pre-amplifier circuit coupled to the head and providing a read data signal and a write data signal, an interface means for providing a write data signal, said preamplifier having a write data signal input, a data recovery circuit having a read data signal input, and a controller for controlling predetermined functions of said disk drive by the issuance of control signals, an improvement for enhancing the recovery of read data, wherein the improvement comprises:

in the read data path, a signal amplifier, including a signal path circuit coupled between said pre-amplifier circuit and said data recovery circuit, and a signal equalization circuit, coupled to said signal path circuit, that increases the high-frequency signal gain of said signal path circuit, and first means, responsive to a first predetermined control signal provided by said controller, for reducing a the high-frequency signal gain due to said signal equalization circuit;

in the write data path, a precompensation logic unit coupled between said interface means and said preamplifier circuit that provides correction for effective timing shifts of peaks in the read data and second means responsive to a second predetermined control signal provided by said controller for adjusting the amount of correction due to said precompensation logic unit; and wherein said signal path circuit provides a differential signal path including first and second signal conductors respectively including first and second resistors coupled in series therein, and wherein said signal equalization circuit includes a first switch, a first node, an inductor, a third resistor, a second node, and a second switch coupled in series between the input terminals of said first and second signal conductors and a first capacitor coupled between the output terminal of said first signal conductor and said second node and a second capacitor coupled between the output terminal of said second signal conductor and said first node, said control signal controlling the conductive state of said first and second switches.

2. A disk drive comprising:

a data surface providing for the storage of data, a read data head for sensing data stored on the data surface, a preamplifier circuit coupled to the read data head and providing a read data signal, a data recovery circuit having a read data signal input, and a controller for controlling predetermined functions of said disk drive by the issuance of control signals, a signal amplifier, including a signal path circuit coupled between said preamplifier and said data recovery circuit, and a signal equalization circuit, coupled to said signal path circuit, that increases the high-frequency signal gain of said signal path circuit, and means, responsive to a predetermined control signal provided by said controller, for reducing the high-frequency signal gain due to said signal equalization circuit, wherein said signal path circuit provides a differential signal path including first and second signal conductors respectively including first and second resistors coupled in series therein, and wherein said signal equalization circuit includes a first switch, a first node, an inductor, a third resistor, a second node, and a second switch coupled in series between the input terminals of said first and second signal conductors and a first capacitor coupled between the output terminal of said first signal conductor and said second node and a second capacitor coupled between the output terminal of said second signal conductor and said first node, said control signal controlling the conductive state of said first and second switches.

* * * * *

UNITED STATES PATENT AND TRADEMARK OFFICE
CERTIFICATE OF CORRECTION

PATENT NO. : 5,530,600
DATED : June 25, 1996
INVENTOR(S) : Shrinkle

It is certified that error appears in the above-indentified patent and that said Letters Patent is hereby corrected as shown below:

Col. 7, line 49, delete "conjunction" and insert ---crowding---.

Col. 9, line 59, delete "circuit.  100" and insert ---circuit 100---.

Col. 10, line 2, after "S$_2$" and before "open" delete "ante" and insert ---are---.

Col. 12, line 10, after "reducing" and before "the" delete "a".

Signed and Sealed this

Nineteenth Day of November, 1996

Attest:

BRUCE LEHMAN

*Attesting Officer*     *Commissioner of Patents and Trademarks*